US009723698B2

(12) United States Patent
Wan et al.

(10) Patent No.: US 9,723,698 B2
(45) Date of Patent: Aug. 1, 2017

(54) REMOTE CONTROL METHOD AND SYSTEM FOR LIGHTING APPARATUS

(71) Applicants: Min-Chuan Wan, Changhua (TW); Sheng-Hung Wang, New Taipei (TW); Chih-Wei Chen, Taipei (TW)

(72) Inventors: Min-Chuan Wan, Changhua (TW); Sheng-Hung Wang, New Taipei (TW); Chih-Wei Chen, Taipei (TW)

(*) Notice: Subject to any disclaimer, the term of this patent is extended or adjusted under 35 U.S.C. 154(b) by 0 days.

(21) Appl. No.: 15/083,272

(22) Filed: Mar. 28, 2016

(65) Prior Publication Data

US 2016/0286631 A1    Sep. 29, 2016

(30) Foreign Application Priority Data

Mar. 27, 2015   (TW) .................................. 104109872
Oct. 7, 2015    (TW) .................................. 104132950

(51) Int. Cl.
*H05B 37/02*    (2006.01)

(52) U.S. Cl.
CPC ..... *H05B 37/0272* (2013.01); *H05B 37/0227* (2013.01); *Y02B 20/48* (2013.01)

(58) Field of Classification Search
CPC    H05B 37/02; H05B 37/0272; H05B 37/0227; H04L 12/282; H04L 2012/2841; H04L 67/025; G08C 2201/30; G08C 2201/92; G08C 2201/20; H04M 1/67; H04M 1/673; H04M 1/72533; Y02B 20/48
USPC .......... 315/307, 312, 362; 340/12.22–12.24, 340/12.28, 12.3, 4.3, 4.62, 5.1; 348/211.99, 211.2, 211.6; 715/740, 745, 715/747

See application file for complete search history.

(56) References Cited

U.S. PATENT DOCUMENTS

| 8,219,658  | B2 * | 7/2012  | Tokunaga | ............... | G06Q 10/02 |
| | | | | | 705/5 |
| 8,704,644  | B2 * | 4/2014  | Uno | ....................... | G08C 17/02 |
| | | | | | 340/12.22 |
| 2014/0380183 | A1 * | 12/2014 | Esaka | .................... | G06F 3/0481 |
| | | | | | 715/740 |
| 2016/0174346 | A1 * | 6/2016  | Koriyama | .......... | H05B 37/0272 |
| | | | | | 315/130 |
| 2016/0234213 | A1 * | 8/2016  | Kim | ..................... | H04L 63/0876 |

* cited by examiner

*Primary Examiner* — Haissa Philogene
(74) *Attorney, Agent, or Firm* — Che-Yang Chen; Law Offices of Scott Warmuth

(57) ABSTRACT

A remote control system and method for lighting apparatus may include at least a remote-controlled lighting apparatus and an intelligent communication device. The lighting apparatus comprises a lighting unit, a first central processing unit (CPU) and a first communication unit, and the intelligent communication device comprises a second CPU, a second communication unit and at least a button and a storage unit. The storage unit is configured to store a control program, the Universally Unique Identifier of the lighting apparatus and at least an operating command of the lighting apparatus corresponding to the sequential key-in signal. When activated, the control program can execute the operating command stored in the storage unit corresponding to the sequential key-in signal input by a user, and send the operating signal to the lighting apparatus through the second communication unit to remotely control at least a lighting unit of the lighting apparatus.

12 Claims, 16 Drawing Sheets

REMOTE CONTROL METHOD AND SYSTEM FOR LIGHTING APPARATUS

FIELD OF THE INVENTION

The present invention relates to a remote control method and system, and more particularly to a remote control method and system for lighting apparatus.

BACKGROUND OF THE INVENTION

Generally, a conventional lighting fixture that can be remotely controlled is electrically connected to a specific switching circuit therein to be controlled by a corresponding remote controller. With the popularity of smartphones, the lighting fixture can be easily controlled by using the Mobile Application which is known as APP. However, most of the smartphones are operated with touch screens such that the user always needs multiple steps such as unlocking phone, finding mobile APP, choosing and operating mobile APP to access the remote control APP thereby wasting time and reducing the practicability of the remote control system in operation.

In addition, the conventional remote control system is disadvantaged in cases where the user cannot effectively utilize the remote control due to darkness or where the user cannot clearly see the display of controls on the smartphone's touch screen. Therefore, there remains a need for a new and improved design for a remote control method and system for lighting apparatus to overcome the problems presented above.

SUMMARY OF THE INVENTION

The present invention provides a remote control method and system for lighting apparatus which comprises at least a remote-controlled lighting apparatus and an intelligent communication device. The lighting apparatus comprises a lighting unit, a first central processing unit (CPU) and a first communication unit, and the first CPU is electrically connected to the first communication unit and the lighting unit. The first communication unit is configured to receive an operating signal or the pair-disconnected signal from the intelligent communication device, and the first CPU can execute the on/off operation of the lighting unit according to the operating signals received form the intelligent communication device. The intelligent communication device comprises a second CPU, a second communication unit and at least a button and a storage unit, and the second CPU is electrically connected to the first communication unit of the lighting apparatus through the second communication unit. The storage unit is configured to store a control program, an identifier of the lighting apparatus, and at least an operating command of the lighting apparatuses corresponding to the lighting apparatus.

When activated, the control program can execute the operating command stored in the storage unit corresponding to the key-in signal input by a user, and send the operating signal to the lighting apparatus through the second communication unit to remotely control at least a lighting unit of the lighting apparatus. Moreover, the pairing information between the lighting apparatus and the intelligent communication device will be cleared after the lighting apparatus receives the operating signal and completes the operating command.

In one embodiment, the present invention comprises at least one intelligent communication device to pair with at least one lighting apparatus. The lighting apparatus has the first communication unit which is configured to receive the sequential keyed-in signal or the pair-disconnected signal from the intelligent communication device. The first CPU of the lighting apparatus is configured to execute the on/off operation of the lighting unit according to the sequential key-in signal, and the second CPU of the intelligent communication device is connected to the first communication unit of the lighting apparatus through the second communication unit. The storage unit of the intelligent communication device is configured to store the control program, the UUID of the lighting apparatus and at least an operating command of the lighting apparatuses corresponding to the sequential key-in signal. The operating process of the remote control system and method for the lighting apparatus includes following steps:

the intelligent communication device automatically activating the control program after tuning on;

the sequential key-in signal input through the button discriminated by the intelligent communication device;

in case that the sequential key-in signal being correct, the intelligent communication device directly acquiring the operating command in the storage unit corresponding to the sequential key-in signal and pairing with the lighting apparatus, the second CPU driving the second communication device to send the operating signal to the lighting apparatus thereby achieving the on/off operation of the lighting unit of the lighting apparatus;

the lighting apparatus disconnecting with the intelligent communication device after receiving the operating command; and in case that the sequential key-in signal being unable to be found in storage unit, the intelligent communication device having no action.

In another embodiment, the intelligent communication device is paired with a lighting apparatuses group which is composed of at least a lighting apparatus. Each of the first CPU of the lighting apparatuses in the lighting apparatuses group executes the operating command corresponding to the operating signal received from the intelligent communication device to achieve the on/off operation of the lighting units in the lighting apparatuses group. The second CPU of the intelligent communication device is connected to each of the first communication units of the lighting apparatuses in the lighting apparatuses group through the second communication unit, and the storage unit of the intelligent communication device stores a control program, an UUID of the lighting apparatuses and the at least an operating command of the lighting apparatuses corresponding to the sequential key-in signal. The operating process in the present invention for controlling the lighting apparatuses group includes following steps:

the intelligent communication device automatically activating the control program after tuning on;

the sequential key-in signal input through the button discriminated by the intelligent communication device;

in case that the sequential key-in signal being correct, the intelligent communication device directly acquiring the operating command in the storage unit corresponding to the sequential key-in signal, sequentially pairing with the lighting apparatuses in the lighting apparatuses group and sending operating signals to the each of the lighting apparatuses to achieve the on/off operation of the lighting units of the lighting apparatuses in the lighting apparatuses group;

each of the lighting apparatuses disconnecting with the intelligent communication device after receiving the operating command;

repeating above steps till all of the lighting apparatuses in the lighting apparatuses group receiving the operating signal; and in case that the sequential key-in signal input through the button being unable to be found in the storage unit, the intelligent communication device having no action.

The remote control system and method in the present invention can remotely control the lighting apparatus through the intelligent communication device, and, more specifically, allows the user to control the lighting apparatus without unlocking the screen of the intelligent communication device.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
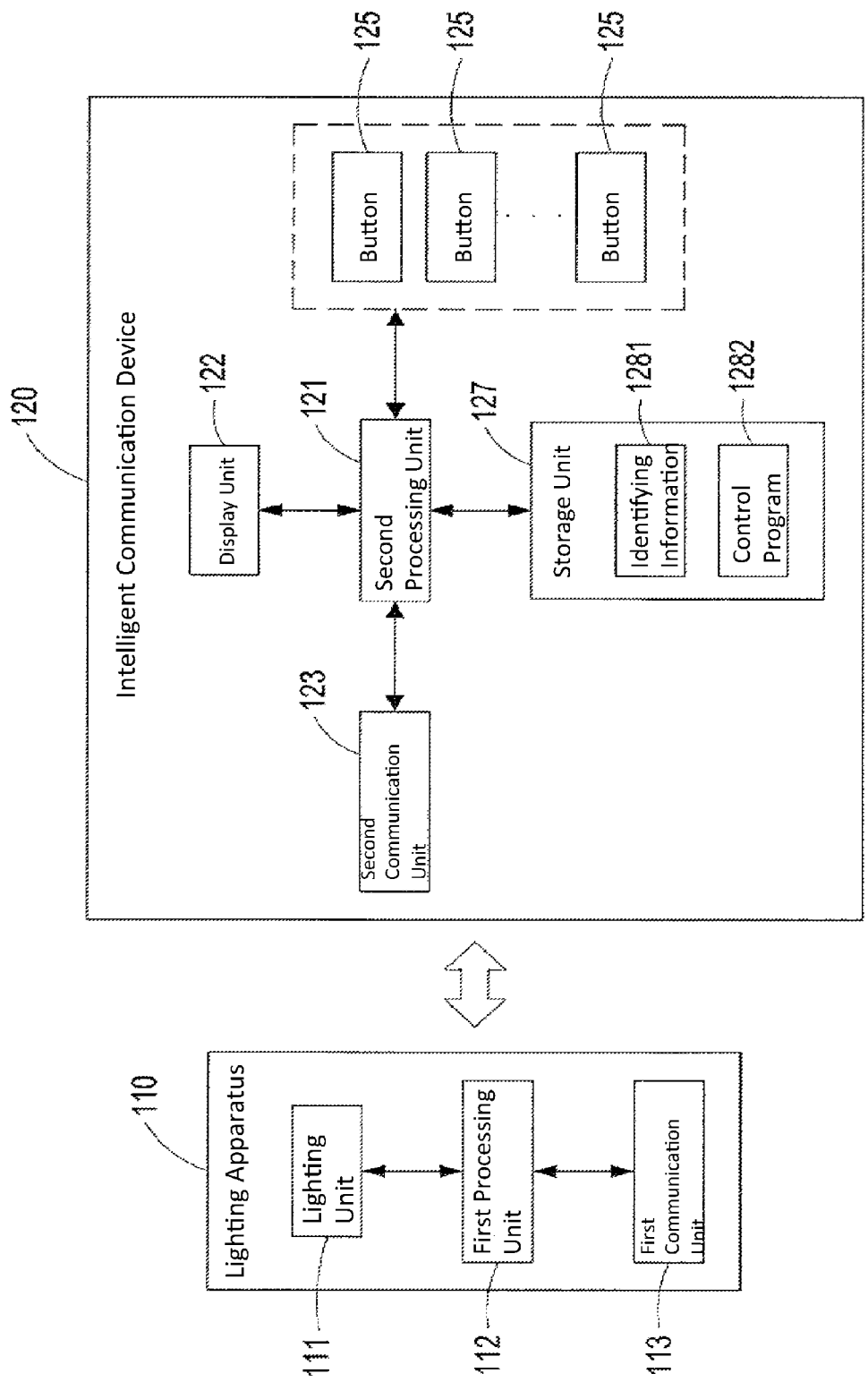
FIG. 1 is a block diagram of a remote control system and method for lighting apparatus in the present invention.

In order to further understand the goal, characteristics and effect of the present invention, a number of embodiments along with the drawings are illustrated as following:

Referring to FIG. 1, the present invention provides a remote control system and method for lighting apparatus which comprises at least a remote-controlled lighting apparatus (110) and an intelligent communication device (120). In this embodiment, only one lighting apparatus (110) is illustrated, and other embodiments of the present invention having more than one lighting apparatus (110) will be discussed later.

The lighting apparatus (110) comprises a lighting unit (111), a first central processing unit (CPU) (112) and a first communication unit (113), and the first CPU (112) is electrically connected to the first communication unit (113) and the lighting unit (111). The first communication unit (113) is configured to receive an operating signal or a pair-disconnected signal from the intelligent communication device (120), and the first CPU (112) can execute the on/off operation of the lighting unit (111) according to the operating signal received form the intelligent communication device (120). In addition, the lighting unit (111) can be a bulb, a fluorescent lamp, or a light-emitting diode (LED).

Before being paired with the intelligent communication device (120) or after receiving the operating signal once, the lighting apparatus (110) will start and keep emitting a preset radio frequency until pairing with any intelligent communication device (120). Moreover, after the intelligent communication device (120) is operated, it will clear previous identifying information of the lighting apparatus (110), and the lighting apparatus (110) will be reset and keep emitting the radio frequency until pairing with any intelligent communication device (120).

The intelligent communication device (120) comprises a second CPU (121), a display unit (122), a second communication unit (123), and at least a button (125) and a storage unit (127), and the second CPU (121) is electrically connected to the display unit (122), the second communication unit (123), the button (125) and the storage unit (127). The display unit (122) is configured to display the status of the intelligent communication device (120) or the status of program running or to receive key-in signals from a user touching the display unit (122).

The second CPU (121) is electrically connected to the first communication unit (113) of the lighting apparatus (110) through the second communication unit (123), and the type of communication protocol between the first communication unit (113) and the second communication unit (123) can be Bluetooth Communication Protocol or Zigbee Communication Protocol. After pairing with the lighting apparatus (110) through the second communication unit (123), the intelligent communication device (120) can acquire the Universally Unique Identifier (UUID) (1281) of the lighting apparatus (110).

The storage unit (127) is configured to store the UUID of the lighting apparatus (110) and at least a control program (1282). The second CPU (121) is configured to carry out the control program (1282) which can search the operating command in the storage unit (127) corresponding to the sequential key-in signal entered by the user. The second CPU (121) can acquire the UUIDs (1281) corresponding to different kinds of lighting apparatuses (110) through different acquiring methods including, but not limited to, traditional methods, or other methods such that using a camera device of the intelligent communication device (120) to scan a Quick Response code, which is known as QR code, of the lighting apparatus (110).

The button (125) can be, but not limited to, at least a volume control button, a lock screen button, a home button or a power button. Both of the UUID (1281) and the control program (1282) of the lighting apparatus (110) can be stored in the storage unit (127), and, after being turned on, the control program (1282) will send the operating signals corresponding to the sequential key-in signal input by the user through the button (125) to the lighting apparatus (110). Moreover, the control program (1282) can be a built-in function of the intelligent communication device (120) or a mobile APP installed in the intelligent communication device (120).

In addition to sending the operating signals to the lighting apparatus (120), the control program (1282) can also store the sequential key-in signal, the operating commands corresponding to the sequential key-in signals or the operation of group setting. For instance, the user can set up a sequential key-in signal for turning on the lighting apparatus (110) as continuously pressing the volume button of the intelligent communication device (120) three times, thereby the user being able to achieve the remote control effect without unlocking screen of the intelligent communication device (120).

Figure 2A:
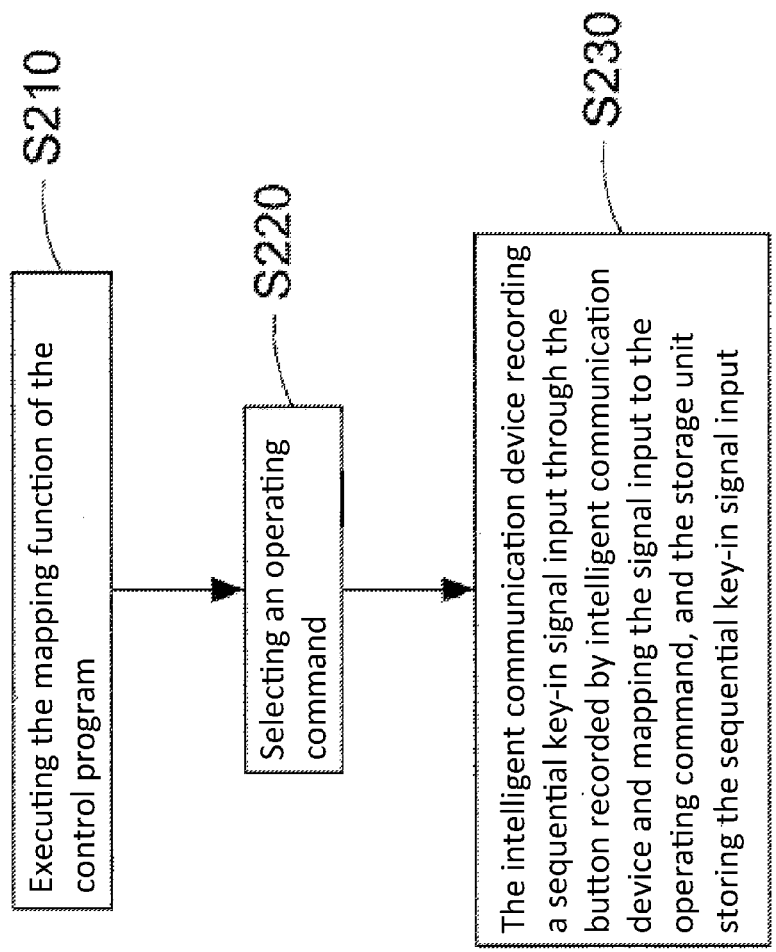
FIG. 2A is a flow chart of mapping process for operating command of the remote control system and method for lighting apparatus in the present invention.

The user can set up the operating commands for the control program (1282) through a mapping process which includes the following steps (as shown in FIG. 2A):

Step S210: executing the mapping function of the control program (1282);

Step S220: selecting an operating command; and

Step S230: the intelligent communication device (120) recording a sequential key-in signal input through the button (125) recorded by intelligent communication device (120) and mapping the signal input to the operating command, and the storage unit (127) storing the sequential key-in signal input.

Figure 2C:
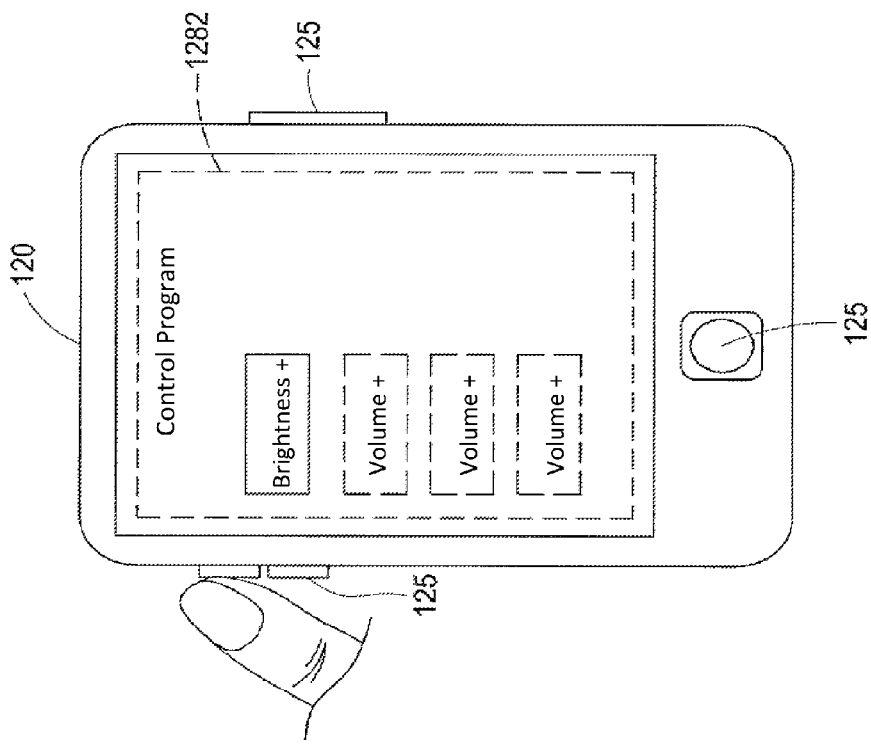
FIG. 2C is an operational illustration of the remote control system and method for lighting apparatus in the present invention.
Figure 2B:
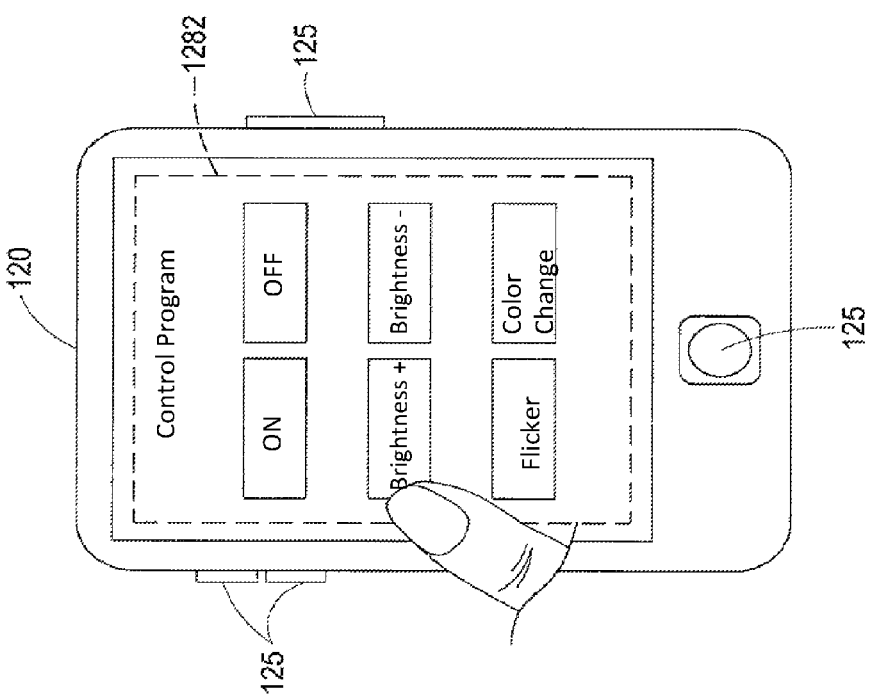
FIG. 2B is an operational illustration of mapping process for operating command of the remote control system and method for lighting apparatus in the present invention.

Generally, the operating commands of the control program (1282) can be preset corresponding to the order or length of sequential key-in signals input through the button (125), and the detailed setup steps are descripted as followings: firstly, after turning on the control program (1282) of the intelligent communication device (120), the user selects an operating command which is prepared to be mapped with a sequential key-in signal. For instance, referring to FIG. 2B, the user can select "increasing brightness" on the main menu and enter a designated sequential key-in signal, such as continuously pressing an increasing volume button of the intelligent communication device (120) three times (as shown in FIG. 2C) to set up the operating command for increasing brightness. After entering the sequential key-in signal through the button (125), the control program (1282) will map the sequential key-in signal to the corresponding operating command and store the sequential key-in signal in the storage unit (127).

Figure 3:
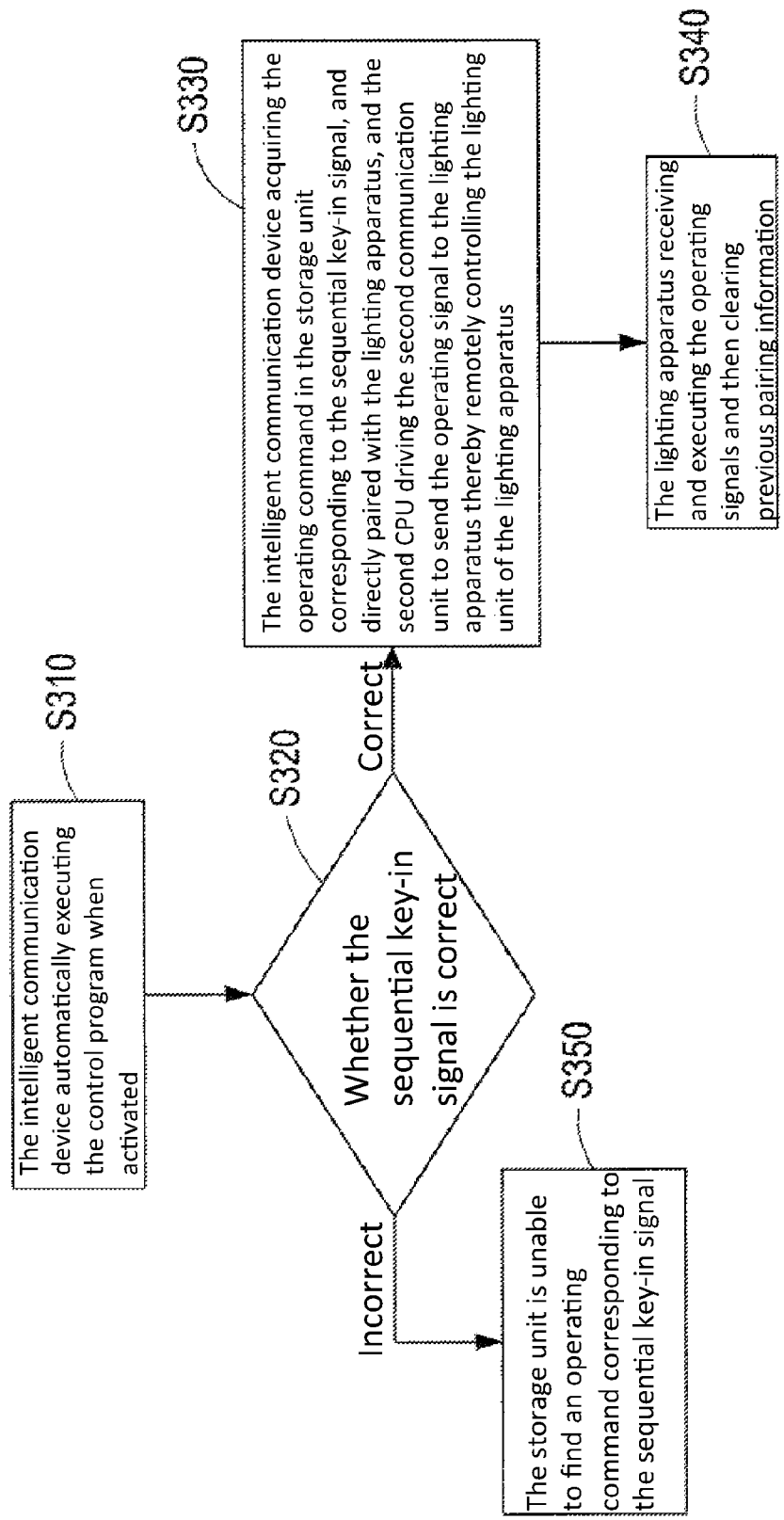
FIG. 3 is an operational flow chart of the remote control system and method for lighting apparatus in the present invention.

After completing the above setup process, the user can control the lighting apparatus (110) through the preset control program (1282), and, in one embodiment, the operating process includes the following steps (as shown in FIG. 3):

Step S310: the intelligent communication device (120) automatically executing the control program (1282) when activated;

Step S320: the sequential key-in signal discriminated by the intelligent communication device (120) to see whether the sequential key-in signal is correct, and if the sequential key-in signal being correct, the operating process allowing to enter Step S330, if not valid, the operating process facilitating redirection to enter Step S350;

Step S330: the intelligent communication device (120) acquiring the operating command in the storage unit (127) corresponding to the sequential key-in signal, and directly paired with the lighting apparatus (120), and the second CPU (121) driving the second communication unit (123) to send the operating signal to the lighting apparatus (110) thereby remotely controlling the lighting unit (111) of the lighting apparatus (110);

Step S340: the lighting apparatus (110) receiving and executing the operating signals and then clearing the previous pairing information; and Step S350: the intelligent communication device (120) having no action when the storage unit (127) unable to find an operating command corresponding to the sequential key-in signal.

After the control program (1282) turned on, the control program (1281) will keep sensing the sequential key-in signals input through the button (125). However, when the control program (1282) is turned off, the button (125) can work as the original keys function of the intelligent communication device (120). For instance, when the button (125) is a volume control button, it will work its original function, adjusting the volume of the intelligent communication (120), when the control program (1282) is not turned on. Similarly, if the button (125) is a home button, it will work its original functions, turning off the apps, navigating to main menu or activating the intelligent communication device (120). Moreover, when the control program (1282) is turned on, the button (125) can have two kinds of functions in the same time, which are the original functions of the intelligent communication (120) and the function of controlling the lighting apparatus (110).

The user can check the on/off status of the control program (1282) of the intelligent communication (120) through the Step S320 which discriminates whether the sequential key-in signal is correct. Moreover, the control program (1282) will discriminate the length and times of the sequential key-in signals input through the button (125) to execute the corresponding operating commands when the sequential key-in signal is correct. Furthermore, the control program (1282) will bypass all of the key-in signals input through the button (125) when the intelligent communication device (120) is turned off.

For conventional pairing method, although the connected pairing can be disconnected from either the controlling part or the controlled part. However, after disconnecting the pairing, the identifying information for pairing will be memorized in both parties such that the same controlling part will directly be re-paired with the same controlled part without verifying the identifying information. On the other hand, the remote control system and method in the present invention can clear the previous pairing information of the intelligent communication device (120) on the lighting apparatus (110) such that the lighting apparatus (110) can be paired with either the same or others intelligent communication device (120). Moreover, the pairing method of the present invention is not limited to the method mentioned above such that the identifying information for pairing on the lighting apparatus (110) can also be cleared by the first CPU (112) of the lighting apparatus (110).

When the sequential key-in signal discriminated by the intelligent communication device (120) is correct, the second CPU (121) will acquire the operating command in the storage unit (127) corresponding to the sequential key-in signal and meanwhile connect the intelligent communication device (120) with the lighting apparatus (110). Furthermore, after sending the operating signals to the lighting apparatus (110), the control program (1282) will disconnect the pairing between the intelligent communication device (120) and the lighting apparatus (110).

Figure 4:
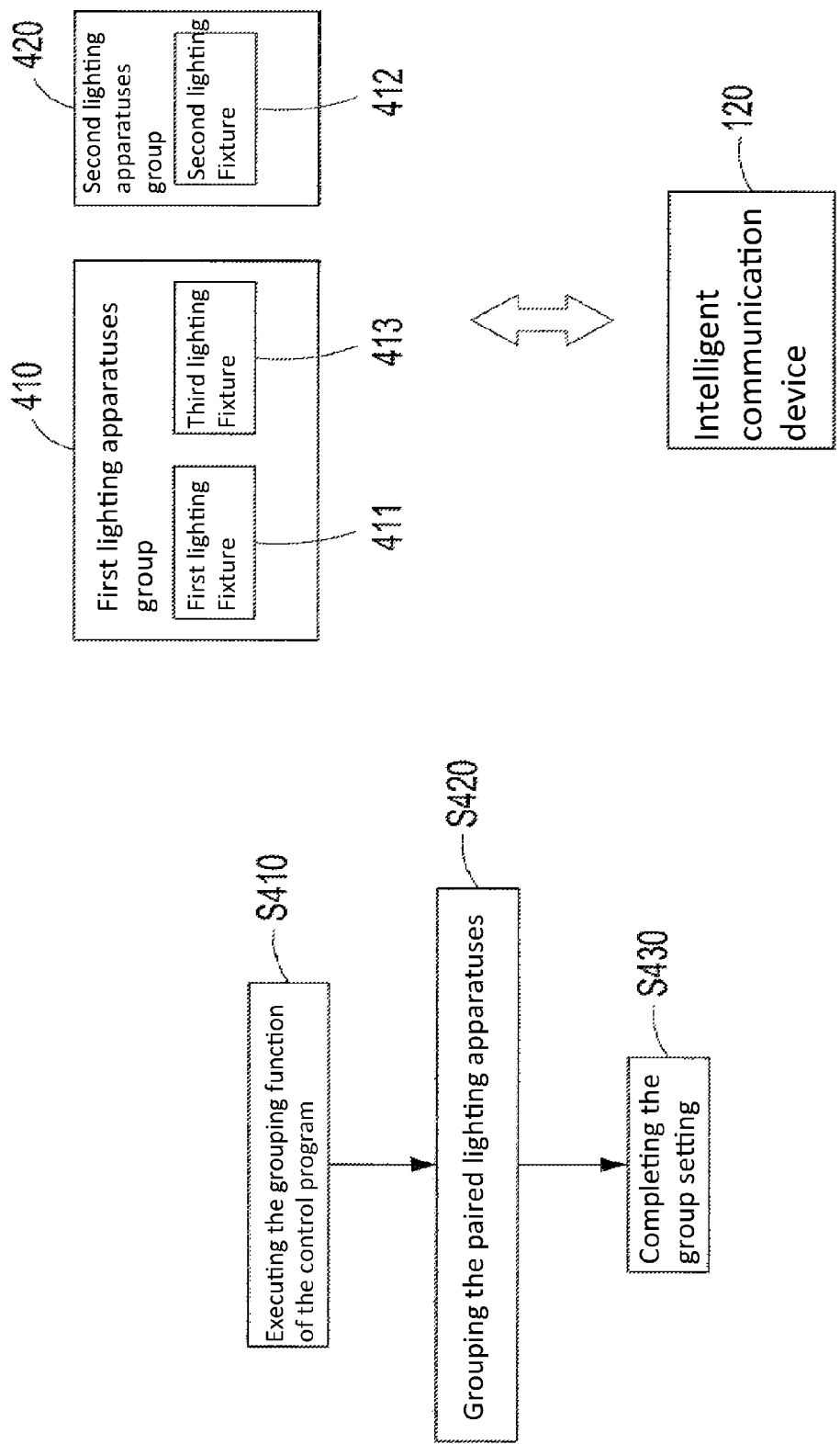
FIG. 4A is a flow chart of grouping setting of the remote control system and method for lighting apparatus in the present invention.
FIG. 4B is an operational illustration of grouping lighting fixtures in different lighting apparatuses groups of the remote control system and method for lighting apparatus in the present invention.

In addition, the remote control system and method of the present invention is not only used for controlling single lighting apparatus (110), but also applied in controlling multiple lighting apparatuses (110). The control program (1282) can set up the group setting for pairing lighting apparatuses (110), and the group setting process includes following steps (as shown in FIGS. 4A and 4B):

Step S410: executing the grouping function of the control program (1282);

Step S420: grouping the paired lighting apparatuses (110); and

Step S430: completing the group setting of designated lighting apparatuses group.

Furthermore, the intelligent communication device (120) can memorize the group setting of the lighting apparatuses (110) which have been paired. Taking the three lighting apparatuses (110) and two lighting apparatuses groups as example, the three lighting apparatuses (110) include a first lighting fixture (411), a second lighting fixture (412) and a third lighting fixture (413) while the two lighting apparatuses groups comprise a first lighting apparatuses group (410) and a second lighting apparatuses group (420). When the user wants to group the first lighting fixture (411) and the third lighting fixture (413) into the first lighting apparatuses group (410) and to put the second lighting fixture (412) into the second lighting apparatuses group (420), the user can directly select each of the lighting apparatuses (110) into the designated lighting apparatuses groups.

Figure 5:
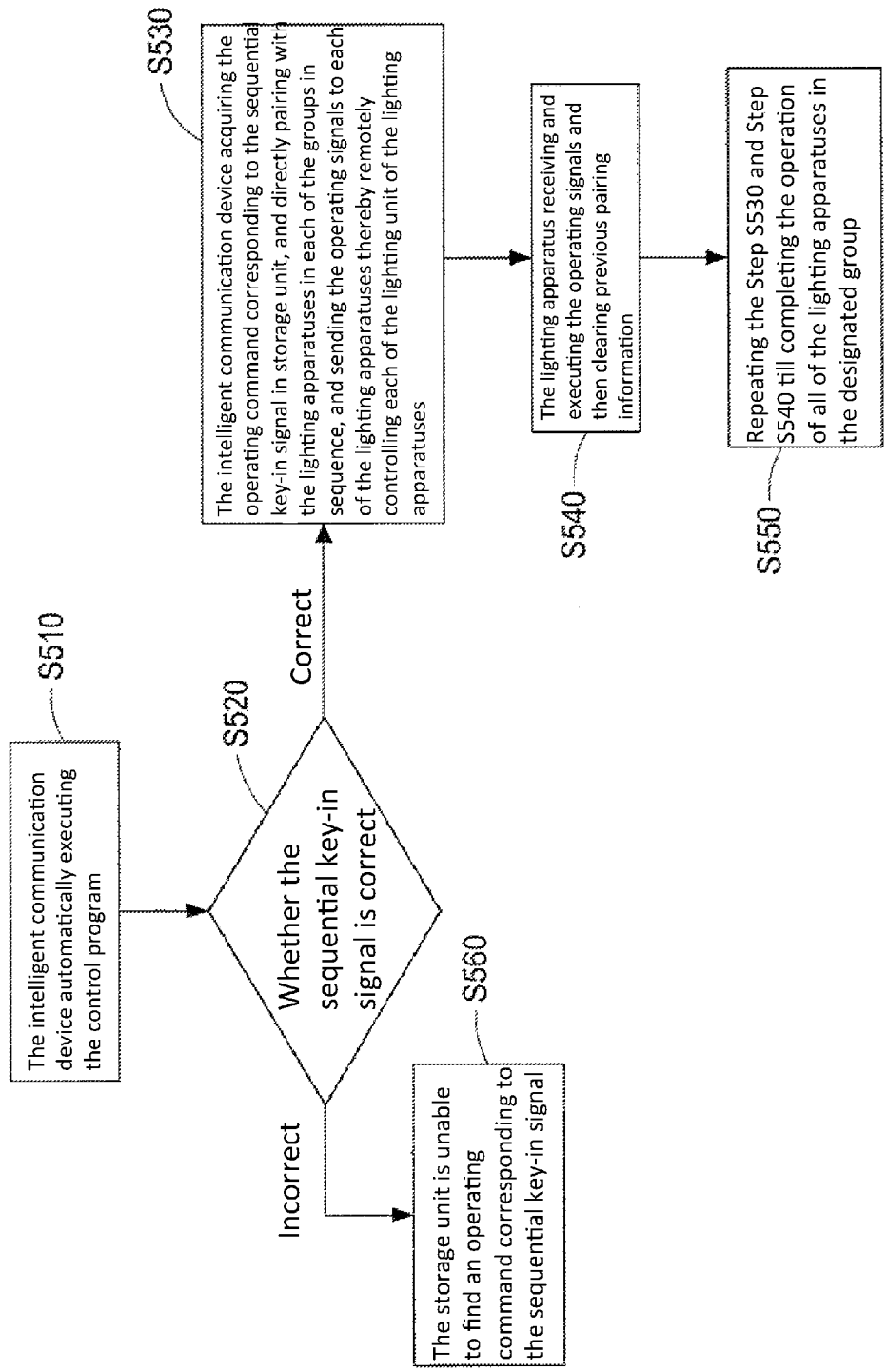
FIG. 5 is another operational flow chart of the remote control system and method for lighting apparatus in the present invention.

Referring to FIG. 5, the operation process of one embodiment of the present invention include following steps:

Step S510: the intelligent communication device (120) automatically executing the control program (1282) when activated;

Step S520: the sequential key-in signal discriminated by the intelligent communication device (120) to see whether the sequential key-in signal is correct, and if the sequential key-in signal being correct, the operating process allowing to enter Step S530, if not valid, the operating process facilitating redirection to enter Step S560;

Step S530: the intelligent communication device (120) acquiring the operating command corresponding to the sequential key-in signal in storage unit (127), and the intelligent communication device (120) directly paired with the lighting apparatuses (120) in each of the groups in sequence, and, in addition, sending the operating signals to each of the lighting apparatuses (110) thereby remotely controlling each of the lighting unit (111) of the lighting apparatuses (110);

Step S540: each of the lighting apparatuses (110) received the operating signals and then clearing the previous pairing information;

Step S550: repeating the Step S530 and Step S540 till completing the operation of all of the lighting apparatuses (110) in the designated group;

Step S560: the intelligent communication device (120) having no action when the storage unit (127) being unable to find an operating command corresponding to the sequential key-in signal.

After activated, the control program (1282) will keep sensing the sequential key-in signals input through the button (125). Moreover, the control program (1282) also discriminates the length and the number of times of the sequential key-in signals input through the button (125) to execute the corresponding operating commands in the storage unit (127) when the sequential key-in signal is correct.

After acquiring the corresponding operating command in the storage unit (127), the second CPU (121) will send the operating signals corresponding to operating command found in the storage unit (127) to each of the lighting apparatuses (110) through the second communication unit (123), and the intelligent communication device (120) will pair with each of the lighting apparatuses (110) in sequence before sending the operating signals. Furthermore, after the control program (1282) sending the operating signals to each of the lighting apparatuses (110), the control program (1282) will disconnect the pairing between the intelligent communication device (120) and the lighting apparatuses (110), and search and connect to a next lighting apparatus (110) in the same group. The "clear" action mentioned in the present invention means to clear the pairing information of the intelligent communication device (120) memorized by the lighting apparatus (110) after disconnected such that the lighting apparatus (110) can be connected with either the same or others intelligent communication device (120). However, the clear action is not limited to the method mentioned above, and the pairing information also can be cleared through the first CPU (112) of the lighting apparatus (110).

Figure 6A:
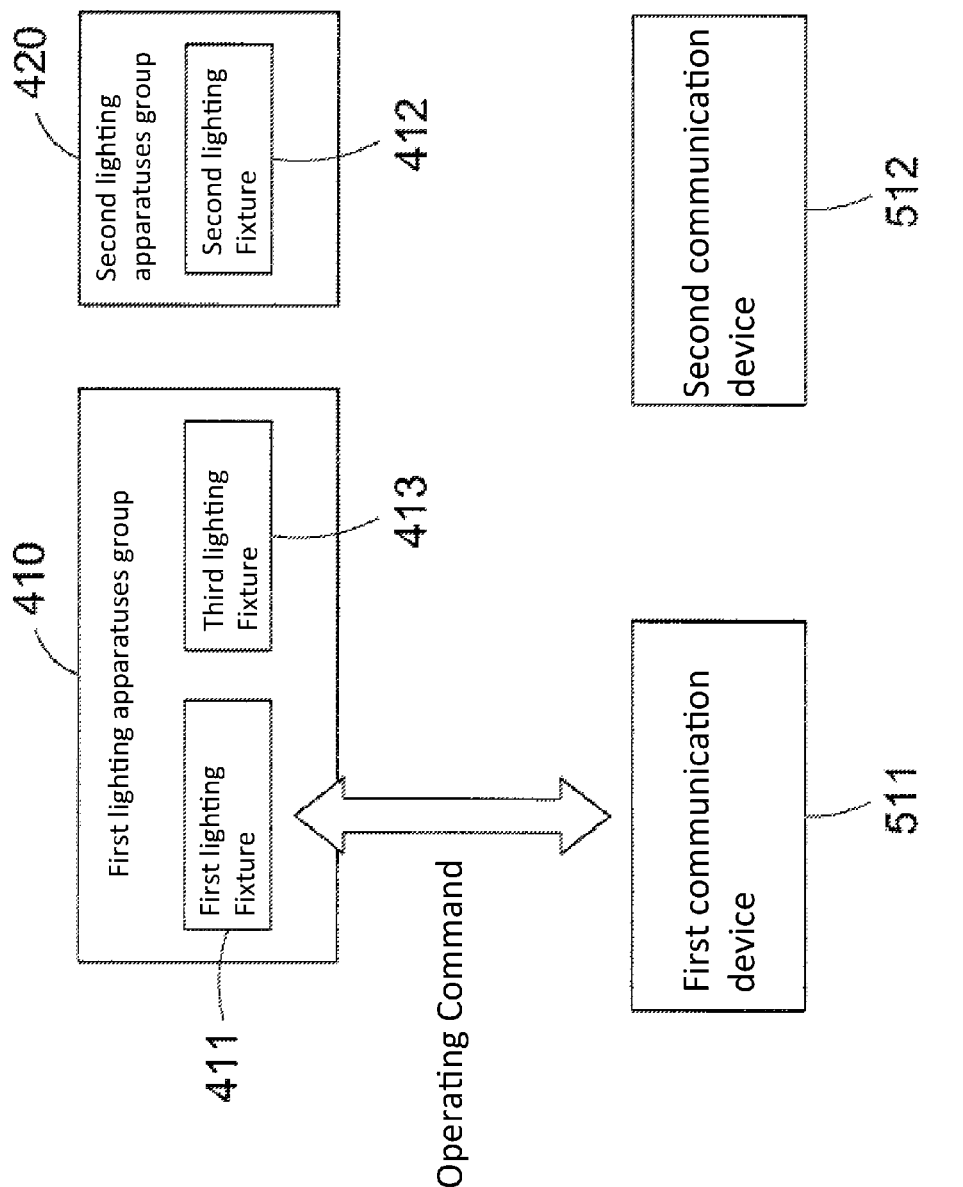
FIG. 6A is a connecting illustration between a first communication device and a first lighting fixture of the remote control system and method for lighting apparatus in the present invention.
Figure 6B:
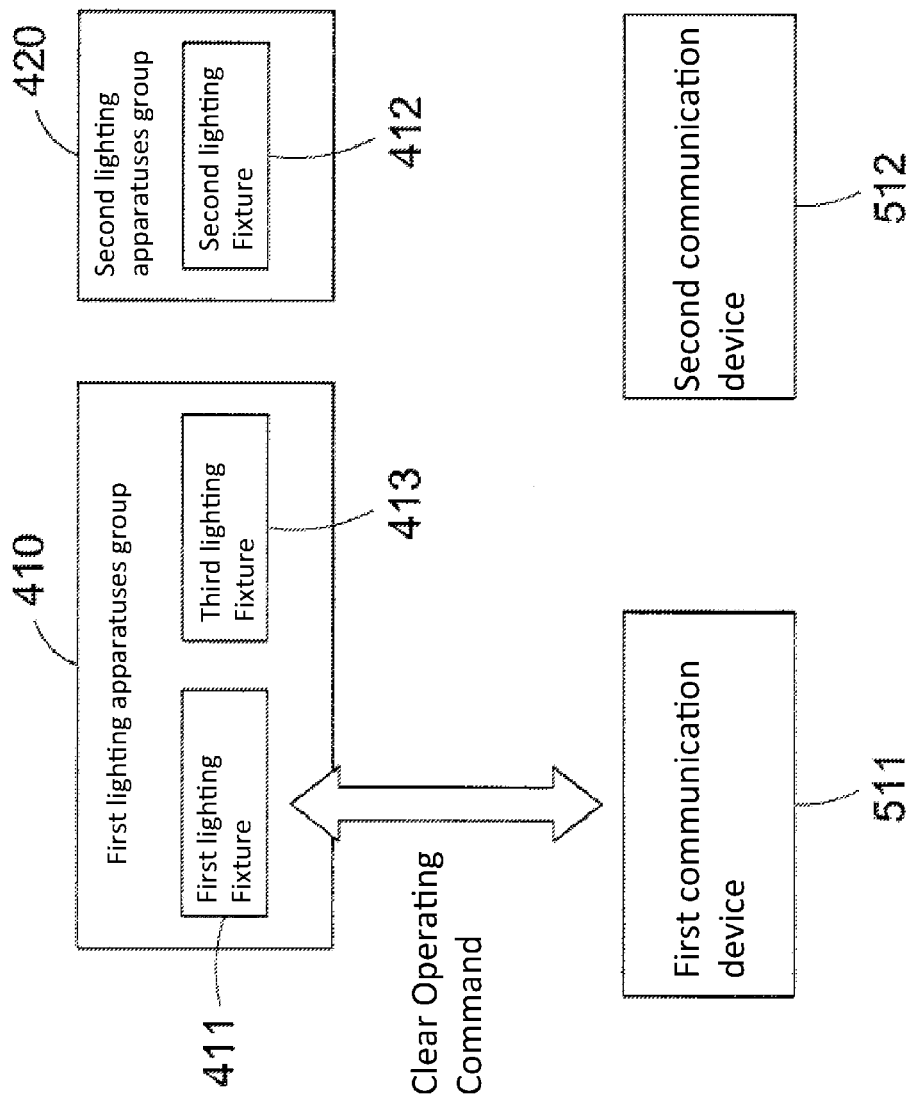
FIG. 6B is an operational illustration of clearing pairing information of the first lighting fixture of the remote control system and method for lighting apparatus in the present invention.
Figure 6C:
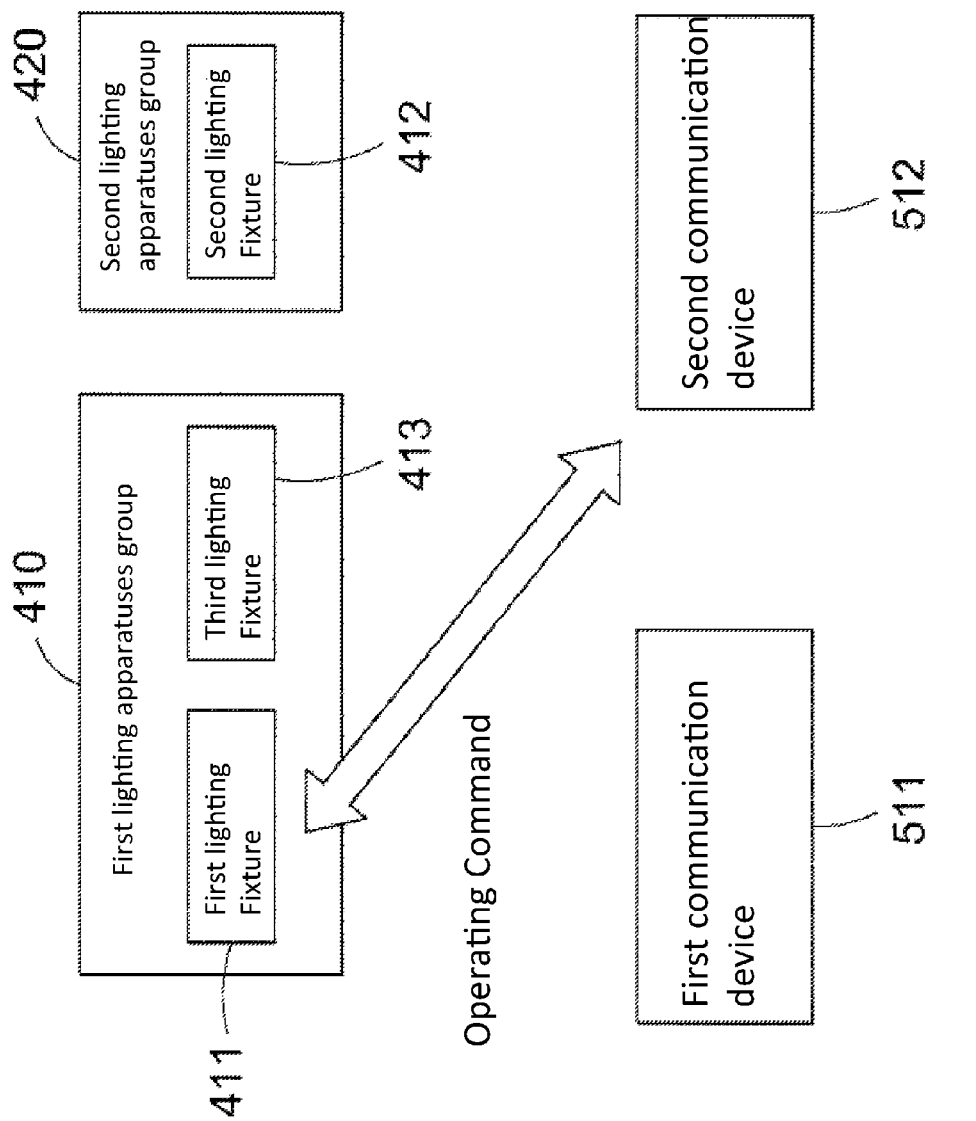
FIG. 6C is a schematic view of a connecting illustration between a second communication device and the first lighting fixture of the remote control system and method for lighting apparatus in the present invention.

Moreover, in one embodiment, referring to FIGS. 6A to 6C, the present invention has two intelligent communication devices (120) which are first communication device (511) and the second communication device (512). The user can set up operating signals for turning on the lighting apparatuses (110) in the first lighting apparatuses group (410) as continuously pressing the increasing volume button three times and for turning off the lighting apparatuses (110) in the first lighting apparatuses group (410) as continuously pressing a decreasing volume button twice. Furthermore, the second communication device (512) is set up the operating signals for reverse operation of first lighting apparatuses group (410) as continuously pressing increasing volume button and decreasing volume button on the button (125) in sequence.

After the control program (1282) of the first communication device (511) turned on, the user can continuously press the increasing volume button on the button (125) of the first communication device (511) three times to activate the control program to search the operating commands and the group setting corresponding to the sequential key-in signals input through the button (125).

Meanwhile, the first communication device (511) is sequentially paired with the first lighting fixture (411) and the third lighting fixture (413) respectively. After the first communication device (511) paired with the first lighting fixture (411), the control program (1282) will send the operating signal to the first lighting fixture (411) and then disconnect pairing and clear the identifying information for pairing between the first lighting fixture (411) and the first communication device (511). After completing the operation of the first lighting fixture (411), the control program (1282) will be continuously paired with and send the operating signal to the third lighting fixture (413). In case of having other lighting fixtures in the first lighting apparatuses group (410), the control program (1282) will repeat the above process till all of the lighting fixtures receive the operating signals.

After completing the operation between the first communication device (511) and the first lighting apparatuses group (410), in case that the control program (1282) of the second communication device (512) is activated, the user can continuously press the increasing volume button and the decreasing volume button on the button (125) to activate the control program (1282) to search the operating commands and the group setting corresponding to the sequential key-in signals input through the button (125). Thus, the second communication device (512) can be sequentially paired with the first lighting fixture (411) and the third lighting fixture (413) of the first lighting apparatuses group (410) and send the operating signals of reverse operation to turn off the light fixtures in first lighting apparatuses group (410). Similarly, since the lighting fixture (411) will clear the identifying information for pairing after disconnecting with the first communication device (511), the second communication device (512) can pair and connect with the first lighting fixture (411).

In one embodiment, the control program (1282) of the first communication device (511) can be set up for connecting to and controlling different lighting apparatuses groups in different time periods. For instance, the sequential key-in signals of turning on and turning off the designated lighting apparatuses groups are respectively pressing increasing volume button three times and decreasing volume button twice. The user can input the above sequential key-in signal to directly connect to and control the lighting fixtures in the first lighting apparatuses group (410), which can be the lighting fixtures in hallway, when the control program (1282) is activated in the daytime, and to directly connect to and control the lighting fixtures in the second lighting apparatuses group (420) which can be the lighting fixtures in living rooms when the control program (1282) is activated in the nighttime.

In another embodiment, the sequential key-in signal can be composed of either one button or the combination of multiple buttons on the button (125). For example, the first sequential key-in signal for controlling the first lighting apparatuses group (410) can be pressing volume control button three times and home button once in sequence, and the second sequential key-in signal for controlling the second lighting apparatuses group (420) can be pressing home button once and volume control button three times in sequence.

The remote control system and method of the present invention can remotely control the lighting apparatus (110) through the button (125) of the intelligent communication device (120), and, more specifically, allows the user to control the lighting apparatus (110) without unlocking screen of the intelligent communication device (120).

Figure 7:
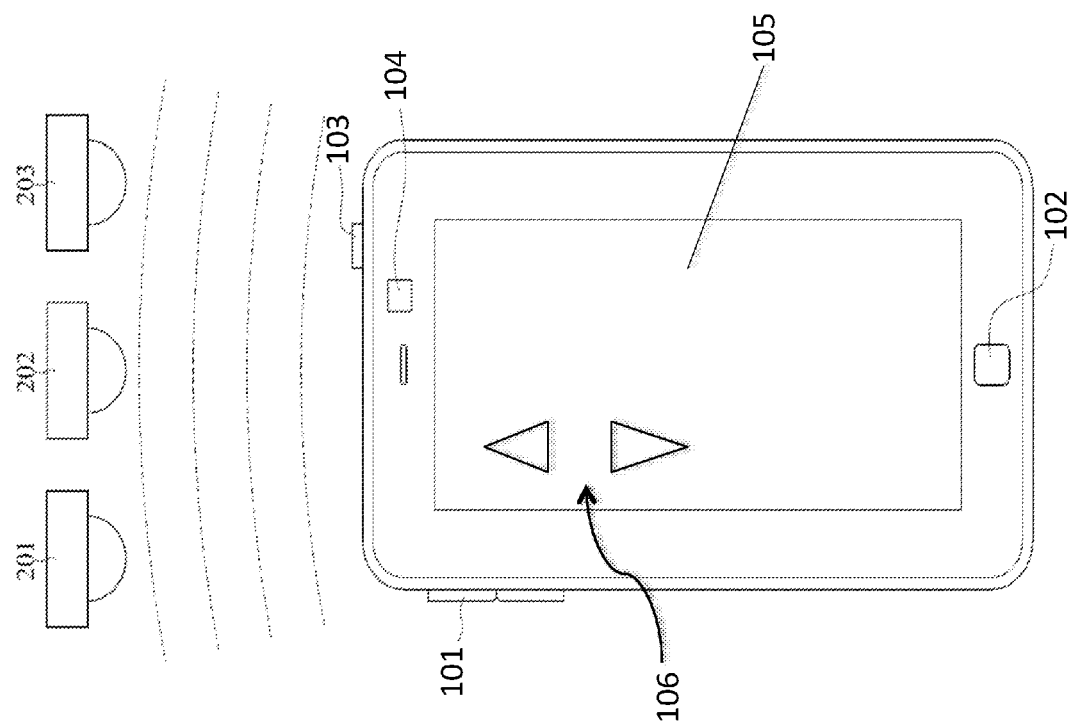
FIG. 7 is a schematic view of a remote control system and corresponding lighting apparatus in the present invention.
Figure 8:
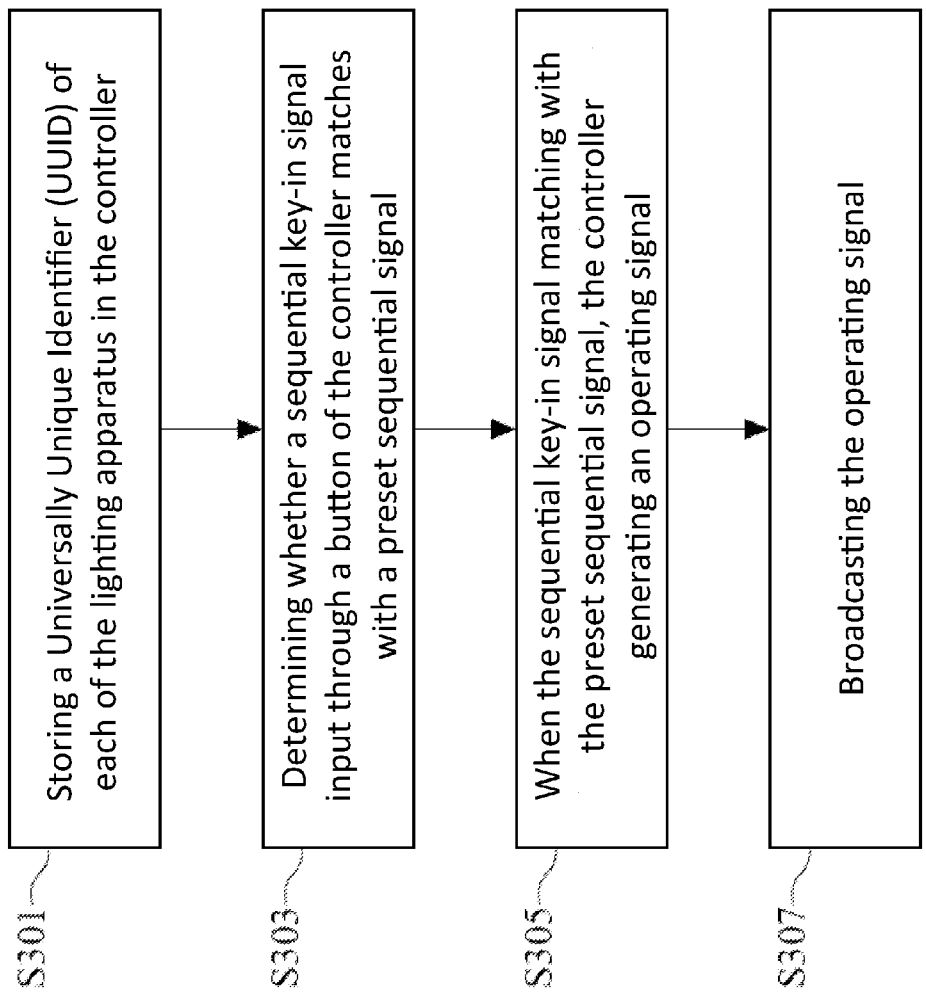
FIG. 8 is a flow diagram of one embodiment of the remote control method for lighting apparatus.

In another aspect, referring to FIGS. 7 and 8, the present invention provides a remote control method for lighting apparatus which is applied to remotely control at least a lighting apparatus. The present invention comprises a controller which can be smart phone, tablet computer or other applicable electronic products, and at least a lighting apparatus which can be bulb, fluorescent lamp, light-emitting diode (LED) or other applicable lighting devices.

The remote control method for lighting apparatus in the present invention has following process. Referring to FIG. 8, in step S301, each of the lighting apparatuses has a Universally Unique Identifier (UUID) which is stored therein. In one embodiment, a smart phone (10) used as a controller is configured to control a set of lighting apparatuses including a first lighting fixture (201), a second lighting apparatus (202) and a third lighting apparatus (203). Moreover, a first UUID (X01) of the first lighting apparatus (201), a second UUID (X02) of the second lighting apparatus (202) and a third UUID (X03) of the third lighting apparatus (203) are stored in the smart phone (10). In one embodiment, the UUIDs (X01)(X02)(X03) of the lighting apparatuses (201)(202)(203) can be attached with the lighting apparatuses (201)(202)(203) when purchasing, and, in one embodiment, each of the UUIDs can be in the form of a Quick Response Code (QR code) which can be scanned by a camera device of the smart phone (10).

Furthermore, a user can set up a sequential key-in signal input through a button unit of the smart phone (10) as a preset sequential signal which corresponds to an operating command. Wherein the button unit can be volume control buttons (101), a home button (102), a screen (105), a power button (103) or other applicable control buttons of the smart phone (10), and the preset sequential signal input by the button unit can be the combination of two or more buttons such as the combination of the increasing volume button and the decreasing volume button of the volume control buttons (101). In another embodiment, the button unit (101) includes virtual buttons that may appear on the screen (105). In step S303, the smart phone (10) can discriminate whether the sequential key-in signal input through the button unit is match with the preset sequential signal, and the sequential key-in signal can be entered by the user through the button unit even when the screen of the smart phone (10) is locked.

For instance, in case that the user sets up a sequential key-in signal, pressing the increasing volume button once and then pressing the decreasing volume button once for a designated operating command. The smart phone (10) will generate an operating signal corresponding to the sequential key-in signal only when receiving the sequential key-in signal which is match with the preset sequential signal, pressing the increasing volume button once and then pressing the decreasing volume button once.

Moreover, in step S305, after receiving the sequential key-in signal which is match with the preset sequential signal, the smart phone (10) will generate a corresponding operating signal to control the lighting apparatuses (201)(202)(203). Wherein the operating signal which is used for operating the lighting apparatuses (201)(202)(203) includes the first UUID (X01) of the first apparatus (201), the second UUID (X02) of the second apparatus (202), the third UUID (X03) of the third apparatus (203) and an operating command corresponding to the sequential key-in signal. Following the example described before, when the user presses the increasing volume button once and then presses the decreasing volume button once from the lock screen, the smart phone (10) will generate the operating signal including the first UUID (X01) of the first apparatus (201), the second UUID (X02) of the second apparatus (202), the third UUID (X03) of the third apparatus (203) and an operating command corresponding to the sequential key-in signal.

In addition, in step S307, the smart phone (10) broadcasts the operating signal. In case that the communication protocol between the smart phone (10) and the lighting apparatuses (201)(202)(203) is Bluetooth Communication Protocol, the smart phone (10) can broadcast the operating signal which has a header comprising the UUIDs (X01)(X02)(X03) and a command content packet of the Bluetooth Communication Protocol comprising the operating command corresponding to the sequential key-in signal. Moreover, when the smart phone (10) broadcasts the operating signal, not only the lighting apparatuses (201)(202)(203) but also other bluetooth devices such as bluetooth speak in the broadcasting range of the smart phone (10) all can receive the operating signal.

After received the operating signal, the lighting apparatuses (201)(202)(203) can discriminate whether the received operating signal has the UUID of designated lighting apparatus. For example, in case that the lighting apparatus discriminates that the header of the received operating signal has the first UUID (X01), and then the first lighting apparatus (201) will execute the action corresponding to the operating command of the received operating signal. Similarly, the second lighting apparatus (202) or the third lighting apparatus (203) will execute the action corresponding to the operating command of the received operating signal when discriminating the header of the received operating signal comprising the second UUID (X02) or the third UUID (X03). On the other hand, although the bluetooth speaker can receive the operating signal, the header of the received operating signal does not have the UUID of the bluetooth speaker such that the bluetooth speaker will not read the command content and execute the operating command of the operating signal.

In one embodiment, the operating command can be turning on the lighting apparatus, turning off the lighting apparatus, reversing switch, flashing the lighting apparatus, changing the color temperature of the lighting apparatus, adjusting the brightness of the lighting apparatus, or other applicable actions. For instance, the user can enter a preset sequential signal, pressing the increasing volume button once and then pressing the decreasing volume button once from the lock screen to turn on the lighting apparatus, or enter another preset sequential signal, pressing the decreasing volume button once and then pressing the increasing volume button to turn off the lighting apparatus. Also, the user can set up two preset sequential signals to correspond to an operating command. For example, the user can set up both of the sequential signals, pressing increasing volume button once and then pressing decreasing volume button once and pressing increasing volume button once and then pressing decreasing volume button as the operating command of revering switch. Moreover, the same sequential key-in signal also can allow the lighting apparatus to execute different actions when the lighting apparatus is in different statuses. For example, the user can set up a sequential key-in signal as pressing increasing volume button once and then pressing decreasing volume button once to turn on the lighting apparatus when the lighting apparatus is off, and to turn off the lighting apparatus when the lighting apparatus is on. However, the applications of the present invention are not limited to the embodiments mentioned above, but are to be accorded the widest scope consistent with the principles and features disclosed herein.

More specifically, after discriminating the sequential key-in signal being match with the preset sequential signal, the smart phone (10), according to the sequential key-in signal, can generate an operating signal comprising a header having the UUIDs of designated lighting apparatuses and send the operating signal by means of broadcasting. After receiving the operating signal from the smart phone (10), each of the lighting apparatuses can discriminate whether the header of the received operating signal comprises their corresponding UUID. In case that the operating signal comprises the first UUID (X01) and the second UUID (X02), and then the first lighting apparatus (201) and the second lighting apparatus (202) will respectively execute the actions according to the operating command of the operating signal. For convenience of illustration, the following description of the present invention is using three lighting apparatuses as example, and a controller of the present invention can be a smart phone or a tablet computer. Moreover, the remote control method in the present invention can be applied in the situations where the screen of the smart phone (10) is locked or unlocked thereby improving the practicability of the present invention.

In actual application, the remote control method for lighting apparatus in the present invention can be executed through an application installed in the smart phone (10), and both the smart phone (10) and the lighting apparatuses have a bluetooth receiver and a bluetooth transmitter to achieve communication. Also, the communication protocol between the smart phone (10) and the lighting apparatuses can be Bluetooth Communication Protocol, Zigbee Communication Protocol or other applicable communication protocol.

Figure 9:
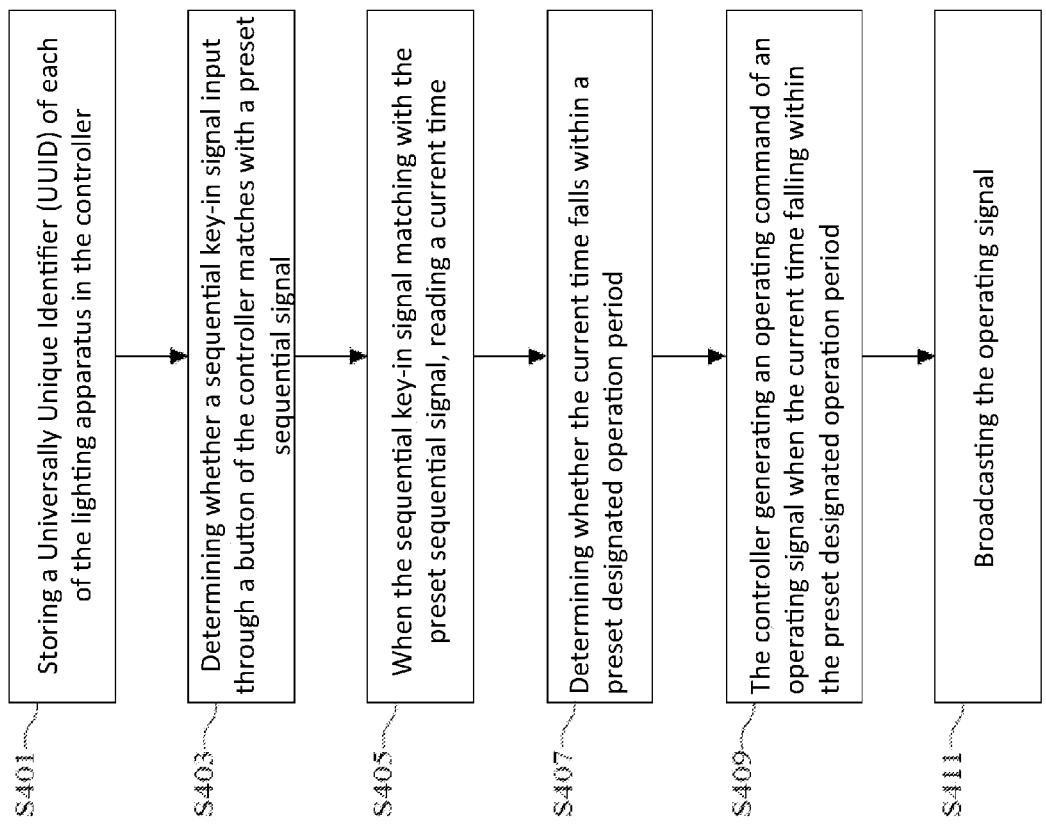
FIG. 9 is a flow diagram of a second embodiment of the remote control method for lighting apparatus.

In the second embodiment of the present invention, referring to FIGS. 7 and 9, step S401 and S403 are almost the same as the step S301 and S303 mentioned in the previous description. In step S405, when the sequential key-in signal input through the button unit is match with preset sequential signal, the smart phone (10) will read the current time. Wherein, in one embodiment, the current time is the system time of the smart phone (10). In step S407, the smart phone (10) discriminates whether the current time falls within a preset designated operation period. In case that the current time falls within the preset designated operation period, the operation enters into step S409 which is that the smart phone (10) generates the operating command of the operating signal according to the preset designated operation period, and then, in step S411, the smart phone (10) starts broadcasting and sends out the operating signal.

For example, after the user enters a sequential key-in signal which is match with the preset sequential signal, pressing the increasing volume button once and then pressing the decreasing volume button once, from the lock screen, the smart phone (10) will read the system time of the smart phone (10) and discriminate whether the system time falls within the preset designated operation period. In case that the current time of the smart phone (10) is 9 pm, and the preset designated operation period is 8-10 pm. When the smart phone (10) discriminates that the current time, 9 pm, falls within the preset designated operation period, 8-10 pm, the smart phone (10) will generate and send an operating signal according to the sequential key-in signal and the preset designated operation period. In another case that the user can preset the designated operation period for turning on the lighting apparatus and turning off the lighting apparatus as 6-8 pm and 8-10 pm. When the smart phone (10) receives a preset sequential signal in 6-8 pm, the smart phone (10) will send the operating signal of turning on the lighting apparatus. On the other hand, when the smart phone (10) receives the same preset sequential signal in 8-10 pm, the smart phone (10) will send the operating signal of turning off the lighting apparatus. However, the present invention is not limited to the embodiments mention above, the user can preset different preset sequential signals for different operating commands and different designated operation periods to achieve more comprehensive operations.

Figure 10:
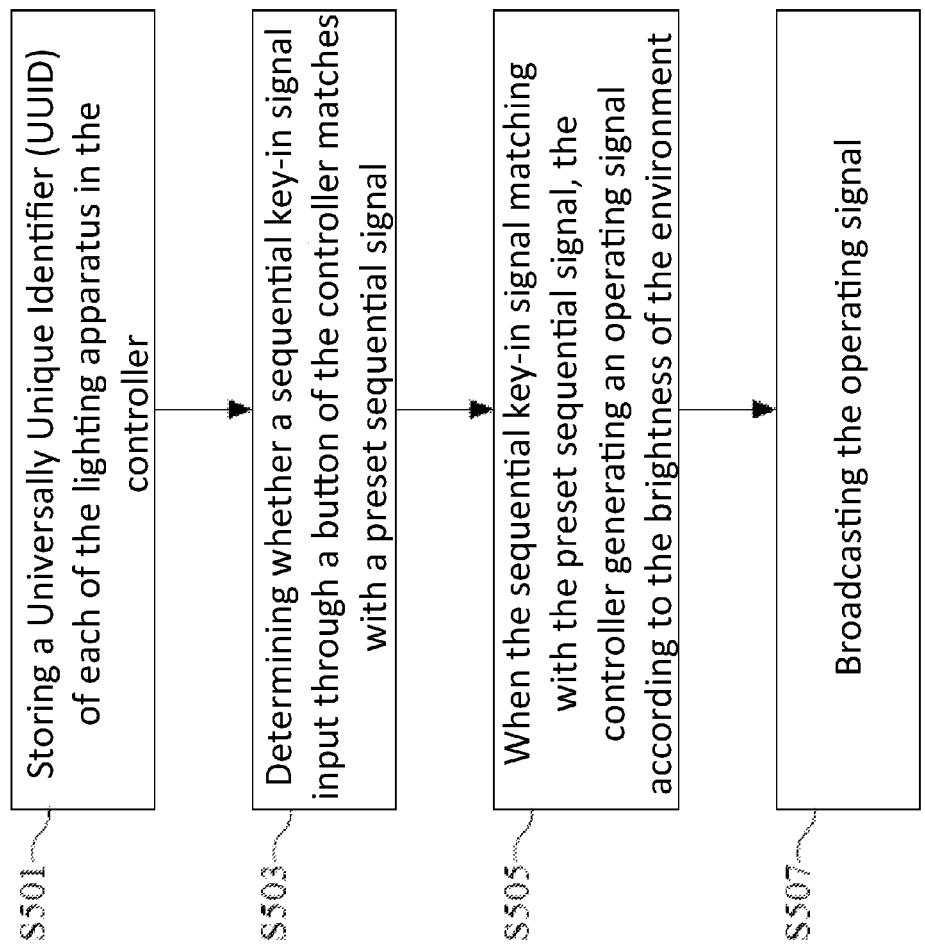
FIG. 10 is a flow diagram of a third embodiment of the remote control method for lighting apparatus.

In the third embodiment of the present invention, referring to FIGS. 7 and 10, step S501 and S503 are almost the same as the step S301 and S303 mentioned in the previous description. In step S505, after discriminating the sequential key-in signal input through the button unit which is match with the preset sequential signal, the smart phone (10) will generate an operating command of an operating signal according to the information of surrounding brightness. Wherein the information of surrounding brightness can be acquired from an optical sensor (104) of the smart phone (10), and also the user can preset a threshold of surrounding brightness level to allow the smart phone (10) to generate different operating signals according to the currently surrounding brightness. Then, in step S507, the smart phone (10) starts broadcasting and sends out the operating signal.

For instance, after the user enters a sequential key-in signal which is match with the preset sequential signal, pressing the increasing volume button once and then pressing the decreasing volume button once, from the lock screen, the smart phone (10) starts to detect the surrounding brightness through the optical sensor (104) of the smart phone (10). When the detected surrounding brightness is lower than the preset threshold, the smart phone (10) will generate and send an operating signal to turn on the lighting apparatus. On the other hand, when the detected surrounding brightness is higher than the preset threshold, the smart phone (10) will generate and send an operating signal of turning off the lighting apparatus.

In another embodiment, the smart phone (10) can generate an operating signal according to the status of the lighting apparatus. For example, the smart phone (10) can generate an operating signal of turning on the lighting apparatus when the lighting apparatus is currently off, and can generate an operating signal of turning off the lighting apparatus when the lighting apparatus is currently on. It is important to note that the operating signal can be considered a reverse operating command to turn the light on when the light is off, and to turn the light off when the light is on.

In addition, in case that a sequential key-in signal input through the button unit is not match with the preset sequential signal, the smart phone (10) can execute the original function of the button of the smart phone (10) or be inactivated. For example, when the sequential key-in signal, which is continuously pressing increasing volume button twice, is not match with the preset sequential signal, the smart phone (10) can be inactivated or execute the original function, increasing the volume of the smart phone (10).

Furthermore, in one embodiment, the smart phone (10) can remotely control a lighting apparatuses group which comprises more than one lighting apparatus at one time. For example, the lighting apparatuses group comprise a first bluetooth lighting apparatuses group, a second bluetooth lighting apparatuses group and a bluetooth fluorescent lamp. In one embodiment, from the lock screen, the user can turn on the first bluetooth lighting apparatuses group by continuously pressing the increasing volume button twice, turn on the second bluetooth lighting apparatuses group by continuously pressing the decreasing volume button twice, and turn on the fluorescent lamp by continuously pressing the home button twice. Moreover, in one embodiment, with the function of application installed in the smart phone (10), the user can optionally group the lighting apparatuses and set up different operating signals for corresponding lighting groups. For the example mentioned above, when the user continuously presses the increasing volume button twice, the application of the smart phone (10) can write the UUIDs of the lighting apparatuses, which are in the first bluetooth lighting apparatuses group, in a header of an operating signal or in each of headers of operating signals, and send out the operating signal or the operating signals by means of broadcasting. After receiving the operating signal, the lighting apparatuses in the first bluetooth lighting apparatuses group can be turned on.

In one embodiment, when the smart phone (10) can write each two UUIDs of two lighting apparatuses which are in the first lighting apparatuses group in each of the operating signals, the application of the smart phone (10) can set these two UUIDs as a group and write them in each of the headers of the operating signals, and then the smart phone (10) can sequentially send the operating signals by means of broadcasting.

Figure 11:
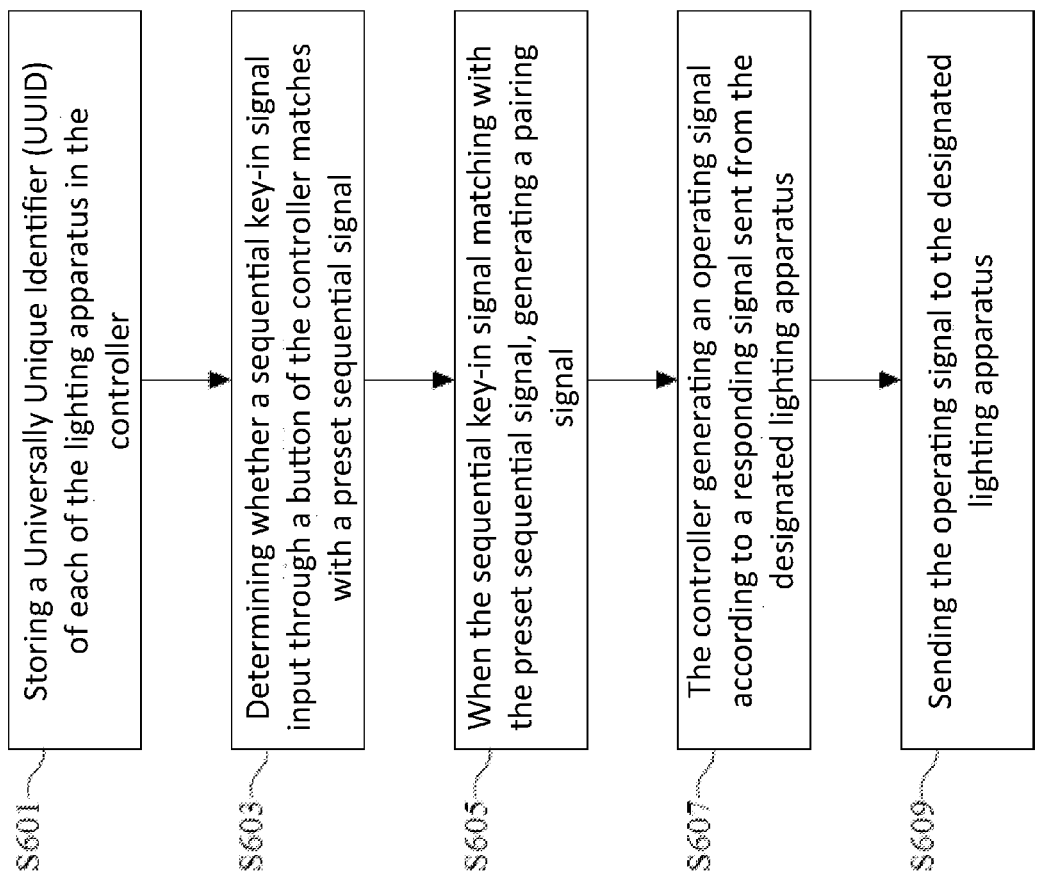
FIG. 11 is a flow diagram of a fourth embodiment of the remote control method for lighting apparatus.

In the fourth embodiment of the present invention, referring to the FIGS. 7 and 11, the remote control method in the present invention can be applied to a remote control device. In step S601, each of the UUIDs of the lighting apparatuses can be stored in the remote control device. In step S603, the remote control device discriminates whether the sequential key-in signal input through the button unit is match with the preset sequential signal. In step S605, In case that the sequential key-in signal is match with the preset sequential signal, the remote control device generates a pairing signal, and the pairing signal, which comprises the UUID of the designated lighting apparatus corresponding to the sequential key-in signal, is configured to pair with the designated lighting apparatus. In step S607, the remote control device can generate an operating signal according to a responding signal from the designated lighting apparatus, and wherein the operating signal comprises the UUID of the designated lighting apparatus and the operating command corresponding to the sequential key-in signal, and the responding signal is a signal sent from the designated lighting apparatus to the remote control device when the designated lighting apparatus receiving the pairing signal. In step S609, after receiving the responding signal, the remote control device sends each of the operating signals to the designated lighting apparatuses.

More specifically, take turning on the first lighting apparatus (201) as an example, the user can acquire the first UUID (X01) of the first lighting apparatus (201) by using the smart phone (10) to scan QR code of the first lighting apparatus (201). Then, the user can enter the preset sequential signal, pressing the increasing volume button once and then pressing the decreasing volume button once, from the lock screen to generate and send the pairing signal, which comprises the first UUID (X01) of the first lighting apparatus (201), to the first lighting apparatus (201). After receiving the pairing signal, the first lighting apparatus (201)

sends the responding signal to the smart phone (10). Then, when receiving the responding signal, the smart phone (10) can pair with the first lighting apparatus (201), and sends the operating signal comprising the first UUID (X01) and the operating command corresponding to the sequential key-in signal to the first lighting apparatus (201) thereby turning on the first lighting apparatus (201).

In one embodiment, after sending the operating signal to the first lighting apparatus (201), the smart phone (10) will further send a confirming signal to confirm whether the first lighting apparatus (201) has accomplished the operating signal. Then, after receiving a accomplishing signal from the first lighting apparatus (201), the smart phone (10) will send a pair-disconnecting signal to the first lighting apparatus (201) thereby disconnecting the pair between the smart phone (10) and the first lighting apparatus (201). In another embodiment, the smart phone (10) can automatically disconnect with the lighting apparatus (201) after sending the operating signal to the lighting apparatus (201).

Moreover, take turning on three lighting apparatuses (201)(202)(203) as an example, firstly, the user can use the smart phone (10) to scan each of QR codes of the first lighting apparatus (201), the second lighting apparatus (202) and the third lighting apparatus (203) to acquire and store the first UUID (X01), the second UUID (X02) and the third UUID (X03) in the smart phone (10). Then, the user can enter a preset sequential signal of turning on the lighting apparatus, pressing the increasing volume button once and then pressing the decreasing volume button once, from the lock screen to generate and send the pairing signal, which comprises the first UUID (X01) of the first lighting apparatus (201), to the first lighting apparatus (201). Then, when receiving the responding signal from the first lighting apparatus (201), the smart phone (10) can pair with the first lighting apparatus (201), and sends the operating signal comprising the first UUID (X01) and the operating command corresponding to the sequential key-in signal to the first lighting apparatus (201).

After receiving the operating signal, the first lighting apparatus (201) will execute the operation to turn on the first lighting apparatus (201). Then, the smart phone (10) disconnects the pair with the first lighting apparatus (201).

After accomplishing the operation of the first lighting apparatus (201), the smart phone (10) will send a pairing signal comprising the second UUID (X02) to the second lighting apparatus (202). Then, when receiving the responding signal from the second lighting apparatus (202), the smart phone (10) can pair with the second lighting apparatus (202), and sends an operating signal comprising the second UUID (X02) and the operating command corresponding to the sequential key-in signal to the second lighting apparatus (202) thereby turning on the second lighting apparatus (202). Then, the smart phone (10) disconnects the pair with the second lighting apparatus (202). Thereafter, as same process as the first and second apparatuses (201)(202) described before, the smart phone (10) pairs and sends an operating signal comprising the third UUID (X03) and the operating command corresponding to the sequential key-in signal to the third lighting apparatus (203) thereby turning on the third lighting apparatus (203). Then, the smart phone (10) disconnects the pair with the third lighting apparatus (203).

In other word, the remote control method in the present invention is achieved by using the smart phone (10) to pair with and send the operating signal to each of the lighting apparatuses one after another. The smart phone (10) pairs with and operates one of the designated lighting apparatuses in one time. After the first apparatus accomplishing the designated operation such as turning on the light, turning off the light or reversing switch, the smart phone will disconnect with the first lighting apparatus (201) and pair with next lighting apparatus till all of the designated lighting apparatuses accomplish the actions. Moreover, either the smart phone (10) or each of the lighting apparatuses can disconnect their pair between the smart phone (10) and the lighting apparatus.

Thus, each of the lighting apparatuses can pair with the other device after disconnecting with one device. For example, after the first user turns on the lighting apparatus through a first smart phone, the second user can use a second smart phone to turn off the same lighting apparatus.

In addition, in the embodiment mentioned above, the smart phone (10) disconnects with the lighting apparatus once the operating signal is sent to the designated lighting apparatus. In another embodiment, the smart phone (10) supports a function to pair with multiple lighting apparatuses (201)(202)(203) in the same time such that the smart phone (10) can disconnect the pairs with lighting apparatuses (201)(202)(203) in sequence after all of the lighting apparatuses (201)(202)(203) accomplish the operations.

Furthermore, after the smart phone (10) disconnecting with the lighting apparatuses, the UUIDs of the lighting apparatuses are not removed from the smart phone (10), so that next time the user through the same smart phone (10) still can directly operate the lighting apparatuses to achieve actions such as turning on the lighting apparatus, turning off the lighting apparatus or reversing switching by entering corresponding sequential key-in signal.

Figure 12:
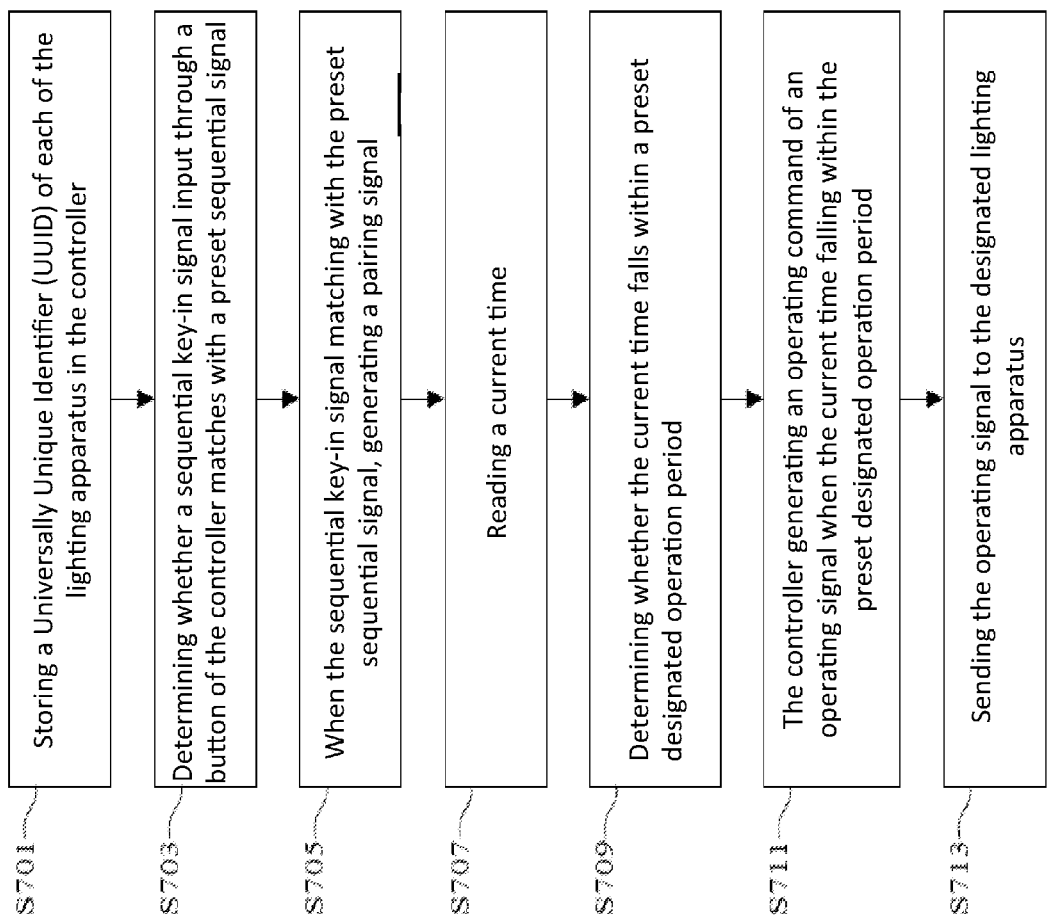
FIG. 12 is a flow diagram of a fifth embodiment of the remote control method for lighting apparatus.

In the fifth embodiment of the present invention, referring to FIGS. 7 and 12, step S701 to S705 are almost the same as the step S601 to S605 mentioned in the previous description. In step S707, the smart phone (10) reads the current time. In step S709, the smart phone (10) discriminates whether the current time falls within preset designated operation period. In step S711, in case that the current time falling within the preset designated operation period, the smart phone (10) will generate each of the operating signals according to responding signals sent from the designated lighting apparatuses and generate each of operating commands of operating signals according to the preset designated operation period. In step S713, the smart phone (10) sends the operating signals to each of the designated lighting apparatuses.

For example, in case that, through the smart phone (10), the user enters the sequential key-in signal which is match with the preset sequential signal, and then the smart phone (10) reads the system time of the smart phone (10) as the current time. For instance, the current time is 9 pm and the preset designated operation period is 8-10 pm. Since the current time falls within the preset designated operation period, the smart phone will generate the operating signals corresponding to the sequential key-in signal. Wherein each of the operating signals comprises the operating command and the UUID of the designated lighting apparatus. After pairing with the first lighting apparatus (201), the smart phone (10) will send the operating signal comprising the operating command and the first UUID (X01) of the first lighting apparatus (201) to the first lighting apparatus (201), and then disconnects with the first lighting apparatus (201). Moreover, by using use the same process mentioned above, the smart phone (10) pairs and sends the operating signal to the second lighting apparatus (202) after disconnecting with the first lighting apparatus (201), and pairs and sends the operating signal to the third lighting apparatus (203) after disconnecting with the second lighting apparatus (202).

Figure 13:
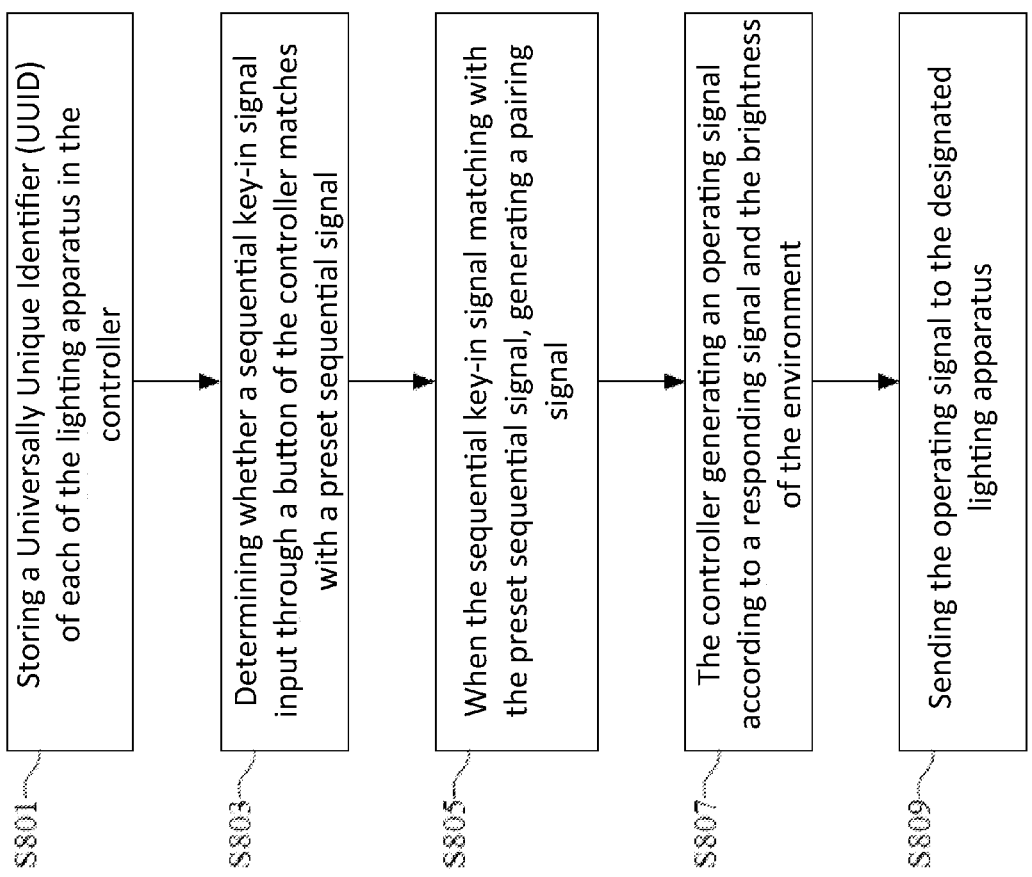
FIG. 13 is a flow diagram of a sixth embodiment of the remote control method for lighting apparatus.

In the sixth embodiment of the present invention, referring to FIGS. 7 and 13, step S801 to S805 are almost the same as the step S601 to S605 mentioned in the previous description. In step S807, the smart phone (10) generates the operating command of the operating signal according to the information of surrounding brightness. Wherein the information of surrounding brightness can be acquired from the optical sensor (104) of the smart phone (10), and the user can preset a threshold of surrounding brightness level to determinate whether the received surrounding brightness passes the threshold thereby generating different operating signals. In step S809, the smart phone (10) sends the operating signal to the designated lighting apparatus.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A remote control method for lighting apparatus applied in a controller which is configured to control at least a lighting apparatus comprising steps of:
   storing a Universally Unique Identifiers (UUIDs) of each lighting apparatus in the controller;
   determining whether a sequential key-in signal input through a button unit of the controller matches with a preset sequential signal;
   wherein when the sequential key-in signal matches with the preset sequential signal, the controller generates an operating signal which comprises at least a UUID of a designated lighting apparatus and an operating command, and the operating command is configured to control at least a designated lighting apparatus to execute an designated action; and
   broadcasting the operating signal.

2. The remote control method for lighting apparatus of claim 1, wherein when the controller is used to control at least a first lighting apparatus and a second lighting apparatus, the operating signal at least includes a first UUID of the first lighting apparatus, a second UUID of the second lighting apparatus and the operating command, and the operating command is configured to control each of the first lighting apparatus and the second lighting apparatus to execute the designated action.

3. The remote control method for lighting apparatus of claim 1, further comprising steps of:
   reading a current time when the sequential key-in signal matching with the preset sequential signal;
   determining whether the current time falls within a preset designated operation period; and
   the controller generating an operating command of an operating signal according to the preset designated operating period, when the current time falling within the preset designated operation period.

4. The remote control method for lighting apparatus of claim 1, wherein when the sequential key-in signal matches with the preset sequential signal, the controller is configured to generate an operating command of an operating signal according to the status of the designated lighting apparatus, and when the designated lighting apparatus is on, the operating command is to turn off the designated lighting apparatus, while the designated lighting apparatus is off, the operating command is to turn on the designated lighting apparatus.

5. The remote control method for lighting apparatus of claim 1, wherein the sequential key-in signal includes a combination of an increasing volume signal and a decreasing volume signal which are on the button unit, and the button unit includes at least a volume increasing button and a volume decreasing button.

6. The remote control method for lighting apparatus of claim 1, wherein the button unit includes virtual buttons.

7. A remote control method for lighting apparatus applied in a controller which has at least a Universally Unique Identifiers (UUID) of a lighting apparatus stored therein to control at least a corresponding lighting apparatus comprising steps of:
   storing a Universally Unique Identifiers (UUIDs) of each of the lighting apparatuses in the controller;
   determining whether a sequential key-in signal input through a button unit of the controller matches with a preset sequential signal;
   wherein when the sequential key-in signal matches with the preset sequential signal, the controller generates a pairing signal, which comprises a UUID of a designated lighting apparatus configured to pair with the designated lighting apparatus;
   the controller generating an operating signal according to a responding signal sent from the designated lighting apparatus, wherein the responding signal generated by the designated lighting apparatus is configured to respond the pairing signal sent from the controller, and the operating signal comprises the UUID of the designated lighting apparatus and an operating command which is configured to control the designated lighting apparatus to execute the designated action; and
   sending the operating signal to the designated lighting apparatus.

8. The remote control method for lighting apparatus of claim 7, further comprising steps of:
   reading a current time when the sequential key-in signal being match with the preset sequential signal;
   determining whether the current time falls within a preset designated operation period; and
   generating an operating command of an operating signal according to the preset designated operating period when the current time falling within the preset designated operation period.

9. The remote control method for lighting apparatus of claim 7, wherein when the sequential key-in signal matches with the preset sequential signal, the controller is configured to generate an operating command of an operating signal according to the status of a designated lighting apparatus, wherein when the designated lighting apparatus is on, the operating command is turning off the designated lighting apparatus, and when the designated lighting apparatus is off, the operating command is turning on the designated lighting apparatus.

10. The remote control method for lighting apparatus of claim 7, wherein the sequential key-in signal includes a combination of a volume increasing signal and a volume decreasing signal which are on the button unit, and the button unit includes at least a volume increasing button and a volume decreasing button.

11. The remote control method for lighting apparatus of claim 7, wherein after generating the operating signal according to the responding signal and sending the operating signal to the designated lighting apparatus, the control method further comprises steps of:
   sending a conforming signal to the designated lighting apparatus; and after receiving an action accomplishing signal from the designated lighting apparatus, disconnecting the pair between the controller and the designated lighting apparatus.

12. The remote control method for lighting apparatus of claim 7, wherein the button unit includes virtual buttons.

* * * * *